United States Patent
Huchin et al.

(10) Patent No.: US 9,844,843 B2
(45) Date of Patent: *Dec. 19, 2017

(54) METHOD FOR PRODUCING TURBINE ENGINE PARTS, AND RESULTING BLANK AND MOULD

(71) Applicant: Snecma, Paris (FR)

(72) Inventors: Patrick Emilien Paul Emile Huchin, Moissy-Cramayel (FR); Karine Deschandol, Moissy-Cramayel (FR); Sébastien Digard Brou De Cuissart, Moissy-Cramayel (FR); Serge Fargeas, Moissy-Cramayel (FR); Marc Soisson, Moissy-Cramayel (FR); Anthony Texier, Moissy-Cramayel (FR); Valéry Piaton, Moissy-Cramayel (FR)

(73) Assignee: SNECMA, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/106,235

(22) PCT Filed: Dec. 9, 2014

(86) PCT No.: PCT/FR2014/053240
§ 371 (c)(1),
(2) Date: Jun. 17, 2016

(87) PCT Pub. No.: WO2015/092218
PCT Pub. Date: Jun. 25, 2015

(65) Prior Publication Data
US 2016/0375530 A1   Dec. 29, 2016

(30) Foreign Application Priority Data

Dec. 20, 2013   (FR) ...................................... 13 63347

(51) Int. Cl.
*B23P 15/02*   (2006.01)
*B22D 13/00*   (2006.01)
(52) U.S. Cl.
CPC .............. *B23P 15/02* (2013.01); *B22D 13/00* (2013.01)
(58) Field of Classification Search
CPC ................................ B23P 15/02; B22D 13/00
See application file for complete search history.

(56) References Cited

U.S. PATENT DOCUMENTS 6,910,270 B2 *   6/2005   Brock ..................... B23P 15/02
                                                        29/557
9,221,096 B2 *   12/2015   Foltz, IV ............... B22D 13/00
(Continued)

FOREIGN PATENT DOCUMENTS

EP   2 290 998 A    1/1996
EP   2 067 546 A1   6/2009
(Continued)

*Primary Examiner* — Jun Yoo
(74) *Attorney, Agent, or Firm* — Blank Rome LLP

(57) ABSTRACT

The invention relates to a method for producing multiple metal turbine engine parts, comprising steps consisting in:
a) casting a metal alloy in a mold in order to produce a blank (3); and
b) machining the blank in order to produce the parts, characterized in that the blank obtained by casting is a solid polyhedron with two generally trapezoidal opposing sides (30a, 30b), and the parts are machined in the blank.

5 Claims, 4 Drawing Sheets

(56) References Cited

U.S. PATENT DOCUMENTS

Figure 1:
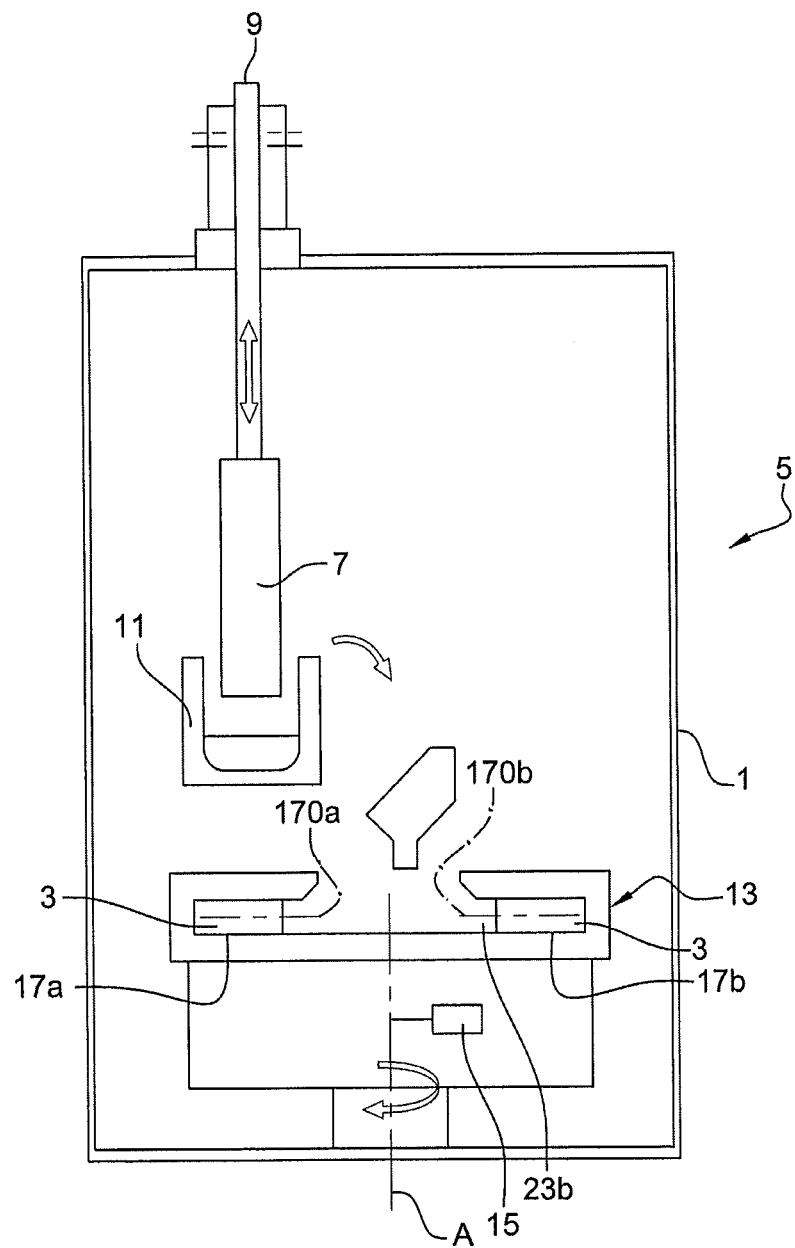

| | | | |
|---|---|---|---|
| 2002/0090302 A1* | 7/2002 | Norris | F01D 5/147 |
| | | | 416/224 |
| 2015/0292339 A1* | 10/2015 | De Ponnat | B23P 15/02 |
| | | | 416/241 R |

FOREIGN PATENT DOCUMENTS

| | | |
|---|---|---|
| EP | 2 223 755 A1 | 9/2010 |
| JP | 2006-336059 A | 12/2006 |
| WO | WO 2008/125129 A1 | 10/2008 |

* cited by examiner

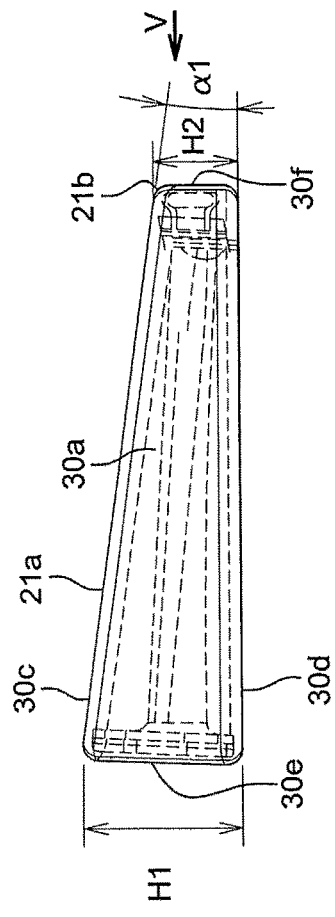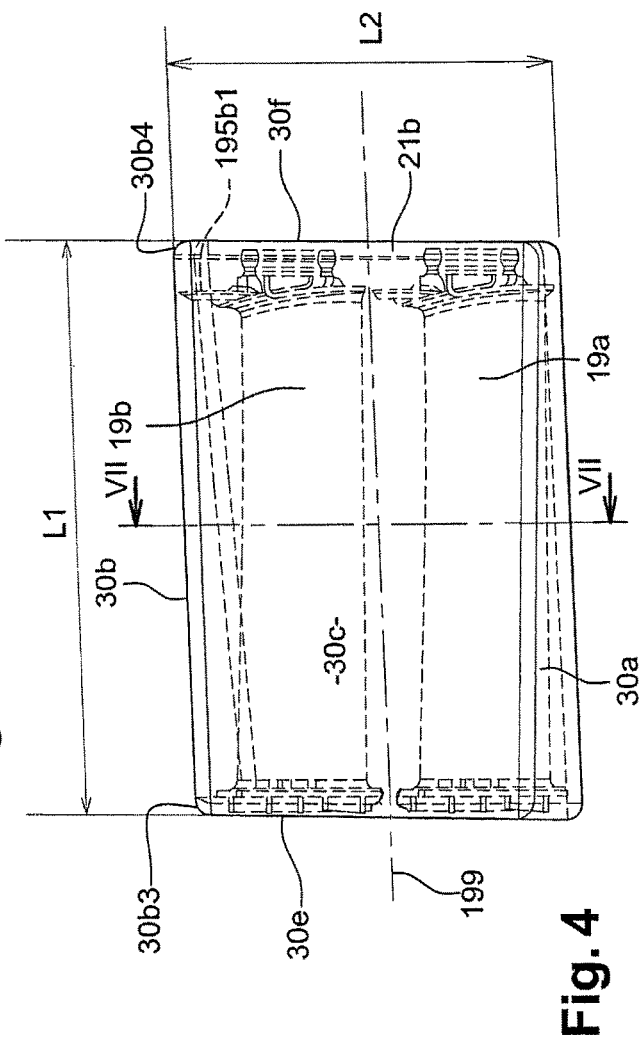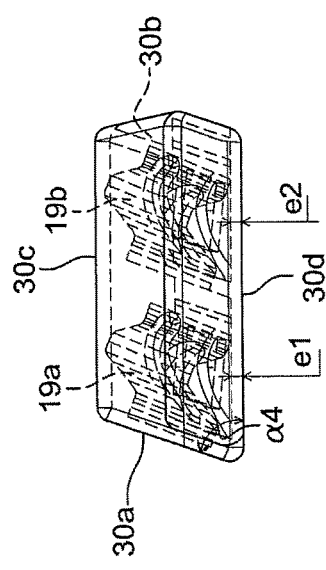

METHOD FOR PRODUCING TURBINE ENGINE PARTS, AND RESULTING BLANK AND MOULD

The present invention relates to a method for producing metal parts for a turbine engine, and more particularly wheel blades for a turbine of a turbojet or a turboprop engine of an aircraft.

To produce several such parts, the following successive steps must be executed:
a) casting a metal alloy in a mould in order to produce a blank, and
b) machining the blank in order to produce the parts, Some cylindrical blanks may have different micro-structures as regards their respective centres and their periphery. This may result in different micro-structures within the same blade.

This is specifically the case for parts made from a TiAl-based metal alloy.

In the present technique, some other blanks are obtained by lost-wax foundry using a ceramic mould, wherein the metal alloy is cast. Developing such single-use mould is difficult. Additionally, interactions between the molten metal and the ceramics may result in casting defects on the surfaces of the blanks, and lost-wax may cause geometrical defects in the blanks, if quality is bad.

Besides, machining several parts in a blank raises difficulties in positioning the parts in the blank. The position of such parts must be compatible with the practices of foundry, machining, and those of the field which the parts are intended for.

The present invention makes it possible to remedy at least a part of the above-mentioned drawbacks, in a simple, efficient and economical way.

According to a first definition, the solution provided here consists in the blank obtained by casting being a solid polyhedron with two generally trapezoidal opposing sides, with the parts being machined in the blank.

To reach the solution provided here, know-how from various areas of competence (foundry, machining) had to be mobilized. The shapes of the blanks and mould cavities resulting therefrom have a pertaining morphology.

As regards the mould used, it is recommended that it comprises at least one polyhedral mould cavity having two opposing sides, each having a general trapezoidal shape, adapted to the moulding of said solid blank.

The mould will preferably be rotating, for the simultaneous moulding of several blanks by centrifugation. The mould will then be connected to means providing rotation about a central rotation axis and will comprise several mould cavities radially extending about said central axis.

Such technology makes it possible to produce TiAL blanks, more particularly for turbine engine blades.

In the field of turbine engines, the method which the mould is intended for can be applied to the moulding of blades, i.e. parts each having a longitudinal axis, and along such axis, a root at one end, a heel at a second end, and a curved section vane which extends there between.

In this application, it is recommended that each blank approaches at least a part of the constraints applied to filling, hardening, stripping, blank cutting and machining of the parts, so that the latter comply with the expected characteristics:

the blank is adapted to totally contain at least two such identical blades, positioned flat, side by side, at a distance from each other, each one having its longitudinal axis passing through the two opposing lateral sides of the blank which are laterally limited by the larger and the smaller bases of the generally trapezoidal opposing sides.

and said blades are thus so machined in the blank that they all have the same orientation.

To optimize the moulding, the two opposing sides of the larger surfaces of the mould will preferably be inscribed in an angle ranging from 2° to 10°, and preferably from 3° to 8°.

Besides, it is recommended that, for blades, obtaining the desired blank means, during the step a), the blank should be so moulded that the two generally trapezoidal opposing sides are substantially parallel and each consist of only one substantially flat face.

The mould, which is, for instance a permanent mould wherein the alloy is cast, will preferably be made of metal, which shall make it possible to limit the contamination of the blank material by that of the mould.

As regards the blanks and with a view to optimizing the machining of the moulded parts, it is also recommended that said parts should all be machined with the same orientation in the blank, with the two opposing sides of the larger surfaces of the mould then being inscribed in an angle ranging from 2° to 10°, and preferably from 3° to 8°.

In this case, it is recommended for each blank to also have two opposing lateral sides having unequal and parallel surfaces each having a height limited by said two sides of the larger surfaces, with said height each ranging from 20 mm to 500 mm.

Figure 2:
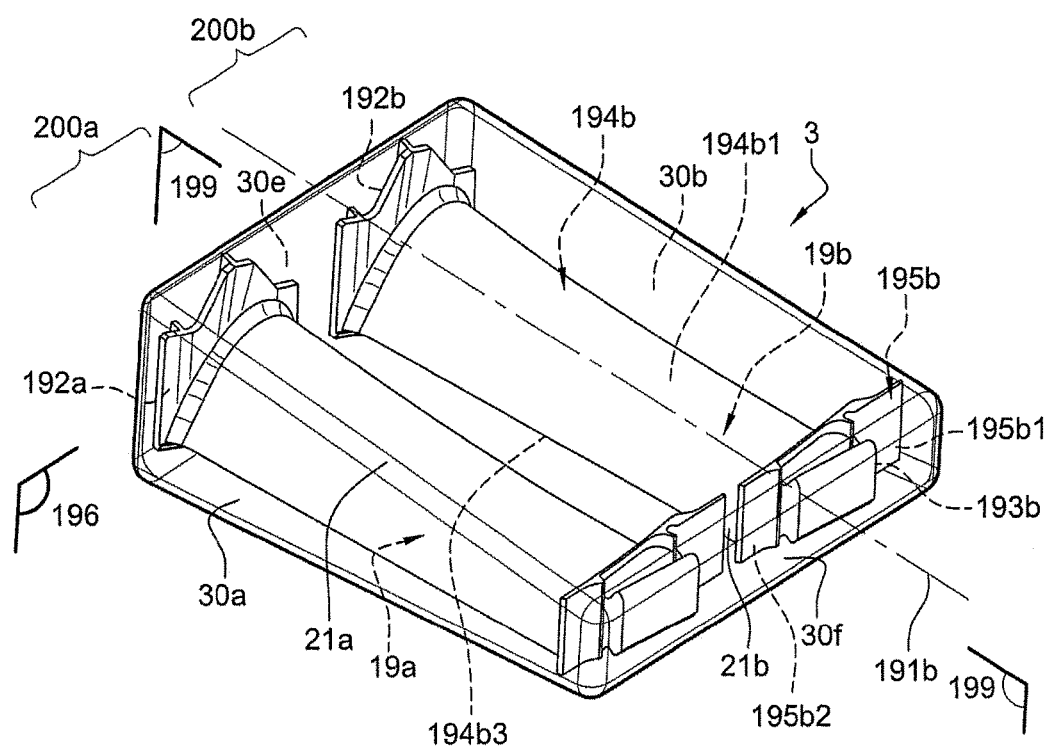
Figure 6:
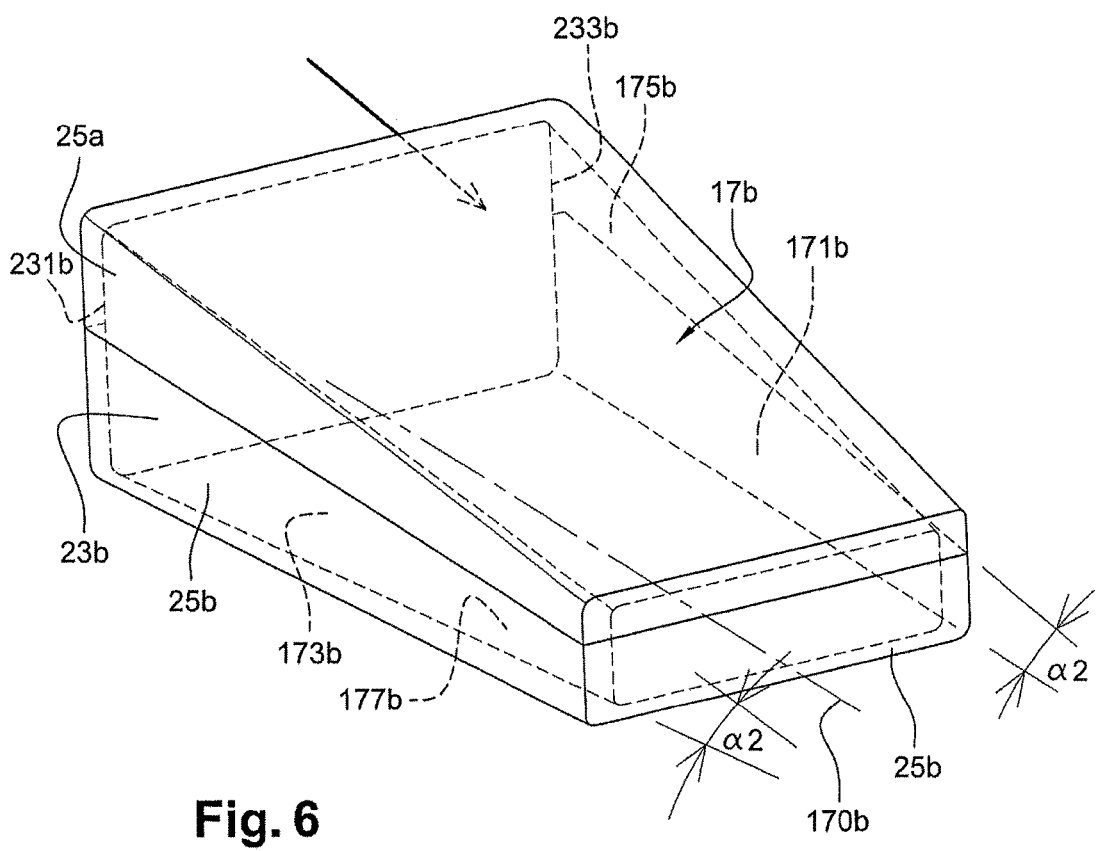
Figure 7:
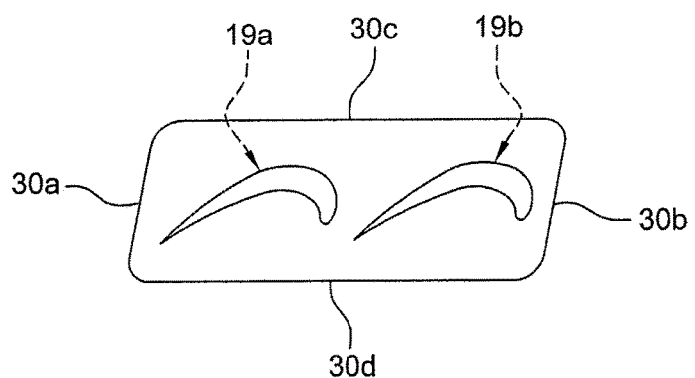

Other characteristics and advantages of the invention will appear upon reading the following description given as a non-restrictive example and while referring to the appended drawings where the FIGS. 3 to 5 have precise dimensions and comply with industrial reality, like dimensioned drawings, wherein:

FIG. 1 schematically shows a device for manufacturing blanks or bars by moulding, FIG. 2 is a schematic view in perspective of a possible first embodiment of a moulded blank, obtained, for instance, using the moulding device of FIG. 1, FIGS. 3, 4, 5 are views of an alternative moulded blank of FIG. 2, from a first side, from above, and from a second side (V arrow), respectively FIG. 6 schematically shows a part of the mould, with its cavity for moulding the blank of FIG. 2, and FIG. 7 is a sectional view of the blank along the VII-VII line in FIG. 4.

FIG. 1 thus shows a device 1 for producing blanks or bars 3, while executing successive melting, casting and moulding operations.

The device 1 comprises a closed sealed enclosure 5 whereto a partial vacuum is applied. A TiAl-based metal alloy ingot 7, for example, is fixed at one end of an electrode 9 which is connected to a terminal of a power source, the other terminal of which is connected to a crucible 11 accommodated in the enclosure 5. When the ingot 7 gets closer to the crucible 11, electric arcs are formed between the crucible and the ingot, which causes the melting of the ingot which then falls down to the bottom of the crucible (VSM: Vacuum Skull Melting). When melting of the ingot is completed in the crucible, the metal alloy is poured into a preferably metallic and permanent mould 13.

Such mould 13 makes it possible to cast the alloy by centrifugation. For this purpose, the mould is rotated about an axis A using an engine 15.

The mould comprises several recesses or cavities, such as 17a, 17b, here, which radially extend about the axis A, which is vertical here. It is recommended for the cavities to be regularly spaced about such axis. The alloy to be cast is brought to the centre and the rotation of the mould distributes it into the cavities.

The axis A will preferably be vertical and the axis (such as 170a, 170b here) in each cavity will be horizontal. In FIG. 1, the mould cavities, such as 17a, 17b, are not shown with the optimized shape(s) thereof, particularly to suit the moulding of a blank 3 complying with that of FIGS. 2 to 5.

The centrifugal forces generated by the rotation of the mould force the molten alloy into such cavities to fill same.

When cooling is completed, the mould 13 is disassembled and the cast parts are extracted.

The shape of the cavities 17a, 17b . . . will of course match that of the parts. The following information regarding the parts or the blanks, will thus also apply to the cavities in the mould.

It can be seen in FIG. 2, which shows the general shape of a moulded blank complying with the solution provided here, and which may be one of those bearing reference 3 above, that the bar or blank 3 is a solid polyhedron with two generally trapezoidal opposing sides 30a, 30b. The blank is an hexahedron. It has a general trapezoid-based prism shape. The prism is a right prism. It could be oblique.

The parts such as 19a, 19b, here two turbine engine blades, will be machined at the appropriate moment in such blank, considered in its solid state.

In FIGS. 2-5, the configuration of the two opposing sides 30a, 30b having a general trapezoidal shape has been optimized.

According to such a preferred embodiment of the blank 3 for blades, once moulded, the blank:
  will be an hexahedron,
  will have the two opposing sides 30a, 30b each consisting of only one substantially flat face, with said faces being substantially mutually parallel.

The base of the side 30a forms an angle α4 ranging from 60° to 80° with the larger faces 30c, 30d, which are preferably flat and substantially mutually parallel.

To obtain appropriate filling of the mould and hardening, positioning in the blank, of the parts such as 19a, 19b with no imbrication, enabling a simple first cut and an overall volume of such blank so defined as to minimise machining times, it is also recommended, as can be seen in FIGS. 2-5:
  that said blades should be so machined in the blank that they all have the same orientation.
  and that the two opposing sides of the larger surfaces 30c, 30d, of the blank should be inscribed in an angle α1 ranging from 2° to 10°, and preferably from 3° to 8°.

Thus, prior to machining the parts, such as 19a, 19b, side by side, but at a small distance from each other, it will be preferred to cut the blank along a very simple line, such as in a plane 199 (FIG. 2):
  passing between two volumes of the blank, each being adapted to totally contain at least one of said parts,
  and cutting the two opposing sides of the larger surfaces of the blank 30c, 30d and two other opposing lateral sides, here 30e, 30f.

FIG. 2 clearly shows that, if the part are blades, each one (for instance the one bearing reference 19b) will have a longitudinal axis 191b and, along this axis, a root 193b adjacent to an internal platform 195b, at a first end, a heel (or external platform) 192b at a second end, and a curved section vane 194b which extends between the platforms. The longitudinal axis 191b may cross the geometrical centre of the root and of the heel.

In this case, the heels, here 192a, 192b, of the blades shall be preferred to be aligned, with the blades being, in the preferred case here, identical and having the same orientation in space when they are machined in the blank. The geometry mentioned above makes this possible.

The respective flat surfaces of the heels, here 192a, 192b, will thus be, as illustrated, aligned and will thus all extend in the same plane 196 parallel to the side (flat face) 30e close to which the machining thereof will be executed.

More particularly, the vanes (such as 194b; FIG. 2) of the blades will additionally be, each, advantageously provided to be machined, with the convex face thereof (such as 194b1 in FIG. 2) being oriented towards the face 30c, with the opposing concave face then being oriented towards the face 30d, as illustrated in FIG. 7.

It shall be noted that the parts 19a, 19b are provided to be machined flat, and positioned substantially horizontally. The blank 3 is thus wider (FIG. 2; direction Y perpendicular to the blade extension axis 191b) than high (vertical direction Z perpendicular to Y).

In FIGS. 2, 4 and 7, the upstream portion (such as 195b1 for the blade 19b) of the internal platform, such as 195b for the same blade, is oriented towards the side 30b. It shall be understood that such upstream portion of the internal platform is the one which is closer to the leading edge of the blade, whereas the downstream portion of said platform (such as 195b2 for the blade 19b) is the closest one to the trailing edge (194b3 for the blade 194b).

Similarly, the depth (such as e1, e2) for face 30d where the blades will be machined in alignment in the blank, will be the same, and will have the same evolution, for each one of the parts. The blank will thus be used at best.

In the preferred case shown:
  the two (preferably mutually parallel), lateral sides 30e, 30f, are perpendicular to one of the two opposing lateral sides of the larger surfaces, here the side 30d,
  two opposing edges of each one of such two lateral sides 30e, 30f define, in pairs, the two smaller bases and the two larger bases of the opposing trapezoidal sides 30a, 30b, respectively.

Besides, the preferred, and recommended illustrated solution is such that, for an optimized control of the overall volume, as regards the blades at issue, the two opposing sides 30a, 30b having a generally trapezoidal shape, are not perpendicular (typically from 2° to 5°) relative to the lateral sides 30e, 30f.

For an optimized machining still, as regards the quality of the end parts and the material used, of several identical blades in the same blank 3, the latter shall preferably be an hexahedron, as illustrated in FIGS. 1-5.

It can also be seen in FIG. 3 that, at least to make it possible to machine, in the blank, any type of current blade, it is recommended, for the two lateral opposing sides 30e, 30f:
  to have unequal and mutually parallel surfaces,
  to have each a height H1, H2 (FIG. 3), different from that of the other one,
  to be limited by said two sides of the larger surfaces, 30c, 30d,
  to have each a height, respectively H1 and H2 ranging from 20 mm to 500 mm.

An angle of 0.1° may exist between the globally trapezoidal sides 30a, 30b, which gives these a substantially parallel configuration.

If, as preferred, the blanks are cast by centrifugation into a rotating mould, such as the mould 13, a shell mould will preferably be used.

Considering what has been mentioned for the blank 3, the mould cavity, specifically if this concerns that of FIG. 1, such as for example the one bearing reference 17b, the following is recommended, as illustrated in FIG. 6 where, for simplification purposes, the blank to be moulded is supposed to be that of FIG. 2:

the/each mould cavity, such as 17a or 17b, is a polyhedron and has two opposing sides 171b, 173b of a generally trapezoidal shape adapted to the moulding of said solid blank, if several blades, all having the same orientation in the block, have to be machined in the moulded blank, the two opposing sides 175b, 177b of the larger surfaces of the mould shall be inscribed in an angle α2 ranging from 2° to 10°, and preferably from 3° to 8°.

the opening giving access to the (each) cavity, here bearing reference 23b, is positioned on the trimmed lateral side of such cavity, trimmed opposing sides 231b, 233b of which are the larger bases of the opposing sides 171b, 173b of a generally trapezoidal shape, the mould enclosure consists (at least) of two shells 25a, 25b, with each one integrating a part of the concerned mould cavity, here 17b.

In this case, the face 30e of the blank will be moulded at the location of, or opposite the opening 23b and the metal alloy will enter the cavity through the opening 23b (refer to the arrow of FIG. 6), and the moulded, hardened blank 3 could leave it there; a simpler stripping of the blank will however be possible if separable shells 25a, 25b are used.

In a particular exemplary embodiment, each blank may have a length L1, between the sides 30e, 30f ranging from 160 to 220 cm, and a length L2 between the base sides 30a, 30b depending on the number of identical parts, having the same orientation in the blank, to be machined therein.

For two blades, as illustrated in FIGS. 3-5, the length L2, may range from 100 to 140 cm. Height H1 and H2 may then range from 40 to 60 cm.

It shall be understood from the above that more than two parts could be machined in the same blank 3, specifically two identical blades 19a, 19b by extending the length L2 only.

All parts shall have the same volume and the same mass.

The invention claimed is:

1. A method for producing multiple metal turbine engine parts, the method comprising:
casting a metal alloy in a mould in order to produce a blank; and
machining the blank in order to produce the parts,
wherein the blank obtained by casting is a solid polyhedron with two trapezoidal opposing sides, and the parts are machined in the blank,
wherein the blank having two lateral opposing sides being limited by two largest sides of the blank, each of the two largest sides being larger than each of said lateral opposing sides,
wherein said parts are blades each having a longitudinal axis and, along such axis, a root at a first end, a heel at a second end, and a curved section vane which extends therebetween,
wherein the blank is adapted to totally contain at least two such identical blades, positioned side by side, but at a distance from each other, and
wherein the two largest sides of the blank are inscribed in an angle ranging from 2° to 10°, so that said blades can be machined in the blank and all have the same orientation, during the casting and machining steps.

2. The method according to claim 1 wherein, during the step a), the blank is so moulded that the two trapezoidal opposing sides are substantially parallel and each consist of only one substantially flat face.

3. The method according to claim 1, wherein, upon moulding, the blank is so moulded that the heels of the blades are aligned along a plane parallel to a lateral face of the blank other than the two largest sides of the blank and other than the trapezoidal opposing sides.

4. The method according to claim 1, wherein, prior to machining said parts, the blank is cut substantially along a plane:
which passes between two volumes of the blank, each being adapted to totally contain at least one of said parts,
and which cuts the two largest sides of the blank and the two lateral opposing sides.

5. A method for producing multiple metal turbine engine parts, the method comprising:
casting a metal alloy in a mould in order to produce a blank; and
machining the blank in order to produce the parts,
wherein the blank obtained by casting is a solid polyhedron with two trapezoidal opposing sides, and the parts are machined in the blank,
wherein said blank having two lateral opposing sides being limited by two largest sides of the blank, each of the two largest sides being larger than each of said lateral opposing sides,
wherein said parts are blades each having a longitudinal axis and, along such axis, a root at a first end, a heel at a second end, and a section vane which extends therebetween,
wherein the blank is adapted to totally contain at least two such identical blades, positioned side by side, but at a distance from each other, and
wherein said blades are so machined in the blank that they all have the same orientation, and
wherein, upon moulding, the blank is so moulded that the heels of the blades are aligned along a plane parallel to a lateral face of the blank other than the two largest sides of the blank and other than the trapezoidal opposing sides.

* * * * *